US008352321B2

(12) United States Patent
Mei et al.

(10) Patent No.: US 8,352,321 B2
(45) Date of Patent: Jan. 8, 2013

(54) IN-TEXT EMBEDDED ADVERTISING

(75) Inventors: Tao Mei, Beijing (CN); Xian-Sheng Hua, Beijing (CN); Shipeng Li, Redmond, WA (US); Linjun Yang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 947 days.

(21) Appl. No.: 12/334,364

(22) Filed: Dec. 12, 2008

(65) Prior Publication Data

US 2010/0153219 A1 Jun. 17, 2010

(51) Int. Cl.
*G06Q 30/00* (2012.01)
(52) U.S. Cl. .................. 705/14.73; 705/14.49
(58) Field of Classification Search .................. None
See application file for complete search history.

(56) References Cited

U.S. PATENT DOCUMENTS

| | | | |
|---|---|---|---|
| 2007/0038614 A1 | 2/2007 | Guha | |
| 2007/0288454 A1* | 12/2007 | Bolivar et al. | 707/5 |
| 2008/0046415 A1 | 2/2008 | Henkin et al. | |
| 2008/0162439 A1* | 7/2008 | Bosarge et al. | 707/3 |
| 2009/0024504 A1* | 1/2009 | Lerman et al. | 705/35 |
| 2010/0138452 A1* | 6/2010 | Henkin et al. | 707/803 |

FOREIGN PATENT DOCUMENTS

WO WO2008130565 A1 10/2008

OTHER PUBLICATIONS

Chen et al, "An Empirical Study of Smoothing Techniques for Language Modeling" Harvard University, retreived on Oct. 14, 2008, 9 pages.

Dekang Lin, "Automatic Retrieval and Clustering of Similar Words" Department of Computer Science, University of Manitoba, retrieved on Oct. 14, 2008, 7 pages.
Mei et al, "Contextual In-Image Advertising", Microsoft Research Asia, retrieved on Oct. 15, 2008, 10 pages.
Collins et al., "Discriminative Reranking for Natural Language Parsing," Massachusetts Institute of Technology, retrieved on Oct. 14, 2008, 42 pages.
"Google AdSense", retrieved on Nov. 12, 2008 at <<https://www.google.com/adsense/>>, 1.
"Google AdWords", retrieved on Nov. 12, 2008 at <<http://adwords.google.com>>, pp. 1-2.
"In Text Advertising: Online Interactive Product Placement", <<http://www.kontera.com/in-text-advertising/ >> retrieved on Nov. 14, 2008, 2 pages.
"In-Line Text Advertising", << http://www.bauer360.com/In-Line%20Text%20Advertising.html>> Retrieved on Nov. 14, 2008, 1 page.

(Continued)

*Primary Examiner* — Namrata Boveja
*Assistant Examiner* — Christopher Busch
(74) *Attorney, Agent, or Firm* — Lee & Hayes, PLLC

(57) ABSTRACT

Computer program products, devices, and methods for generating in-text embedded advertising are described. Embedded advertising is "hidden" or embedded into a message by matching an advertisement to the message and identifying a place in the message to insert the advertisement. For textual messages, statistical analysis of individual sentences is performed to determine where it would be most natural to insert an advertisement. Statistical rules of grammar derived from a language model may be used choose a natural and grammatical place in the sentence for inserting the advertisement. Insertion of the advertisement creates a modified sentence without degrading a meaning of the original sentence, yet also includes the advertisement as a part of a new sentence.

20 Claims, 7 Drawing Sheets

OTHER PUBLICATIONS

"Inline Advertising and Adbrite", <<http://bloghelper.is-there.net/inline-advertising-and-adbrite/>> retrieved on Nov. 14, 2008, 6 pages.

"MediaText: Make Money Online with In-Text Ads" http://www.earnblogger.com/mediatext-make-money-online-with-in-text...>> retrieved on Nov. 14, 2008, 7 pages.

Wen et al., "Query Clustering Using User Logs" Microsoft Research Asia and University de Montreal, Retrieved on Oct. 14, 2008, 23 pages.

Michael Collins, "Three Generative, Lexicalised Models for Statistical Parsing", Michael Collins, Dept. of Computer and Information Science, University of Pennsylvania, Retrieved on Oct. 15, 2008, 8 pages.

"Vibrant In-Text Advertising", <<http://www.vibrantmedia.com/wedpublishers/index.asp>>, retrieved on Nov. 14, 2008, 2 pages.

"Vibrant Media—The In-Text Advertising Leader", retrieved on Nov. 12, 2008 at <<http://www.vibrantmedia.com/>>, 1 page.

Cai et al., "VIPS: a Vision-based Page Segmentation Algorithm", Microsoft Corporation Technical Report, available as early as Nov. 1, 2003, 29 pages.

Hua et al, "When Multimedia Advertising Meets the New Internet Era", Microsoft Research Asia, retrieved on Nov. 14, 2008, 5 pages.

* cited by examiner

IN-TEXT EMBEDDED ADVERTISING

TECHNICAL FIELD

The subject matter relates generally to embedding advertisements in a text of a webpage, and more specifically, to modifying an original text of the webpage by including an advertisement into the text without degrading a meaning of the webpage.

BACKGROUND

Online advertising has become a primary source of revenue for a majority of media and publishing websites. As the importance of online advertising has increased, methods of online advertising have undergone a dramatic evolution. One of the trends of this ongoing evolution is for greater integration of advertisements into web pages.

Similar to other types of advertising, online advertising strives to present relevant advertisements to users in a manner that will capture the attention of the users. Many users are interested in the non-advertising content of a webpage and would prefer to ignore the advertisements. Accordingly, advertising effectiveness may be judged by a relevance of the advertisement to the interests of a user as well as the ability of the advertisement to capture the attention of the user.

Advertising may be largely separate from a main text of the webpage such as advertising in a banner or a sidebar. Advertisements relevant to the content of the webpage may be identified by comparing keywords from the webpage with keywords associated with the advertisement. However, with this method of advertising, it is relatively easy for the user to focus only on the non-advertising content and ignore the banner or sidebar advertisement because the advertisements are placed in the webpage separate from the non-advertising content.

A subsequent evolution of online advertising places advertisements inside the non-advertising content. For example, a word in a text field of the webpage may be a hyperlink to an advertisement. Clicking on the word or rolling over the word can lead to a pop-up advertisement. This model of advertising embeds the advertisements in the non-advertising content of a webpage. However, even though the advertising is associated with the non-advertising content of the webpage, the users may choose not to view the advertisement and the original text remains unchanged.

Accordingly, is desirable to find ways to deeply embed advertisements into non-advertising content in a way that is difficult for users to ignore and yet does not degrade the value of the non-advertising content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, this disclosure describes various exemplary computer program products, methods, and devices for creating embedded advertising. This disclosure describes a novel advertising strategy that associates relevant advertisements with keywords in a webpage and adds advertisements to existing text without degrading the original meaning of the existing text. This strategy for advertising complements existing keyword-based and contextual advertising. Embedded advertising "hides" advertisements in-context by inserting the advertisements into the original content without degrading the meaning of the original content. By analyzing the language in the original content, it is possible to select a relevant advertisement for insertion and appropriate methods to modify the original text in order to insert the relevant advertisement.

An original message, such as a webpage, is a source of keywords that can be extracted from the message. The keywords extracted from the message can be associated with keywords associated with an advertisement. In some implementations, the association may be performed by a specialized server computer. A composition of the extracted keyword, the advertisement, and modifier words may be created by the server computer. The composition can be embedded into the message such that the composition replaces a portion of the text of the message without degrading the original meaning of the message.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed to various exemplary computer programs, methods, and devices for embedding adverting into a message. For example, an advertiser may wish to purchase placement of an advertisement on a certain webpage. The webpage may contain text, images, and other advertisements with one of the text areas being a main text area, such as a news article. The most desirable placement of the advertisement is within the news article because this is the portion of the webpage that a user is most likely to read. Rather than only adding a link to an advertisement in the news article, this disclosure discusses modifying an actual content of the news article, so that the advertisement is included within the text of the news article.

For the sake of convenience, this disclosure uses terms related to a specific implementation, namely text in web pages. However, the teachings of this disclosure are not so limited, but are applicable to any message, textual, aural, visual, animation, or in any other form. In a visual message, such as a movie or picture, an advertisement may be embedded by placing an image on top of another image. For example, a picture of a car may be modified to include a brand logo on the door of the car. In auditory message, a sound such as a doorbell may be replaced with a sound mark of an advertiser.

Exemplary Systems and Devices

Figure 1:
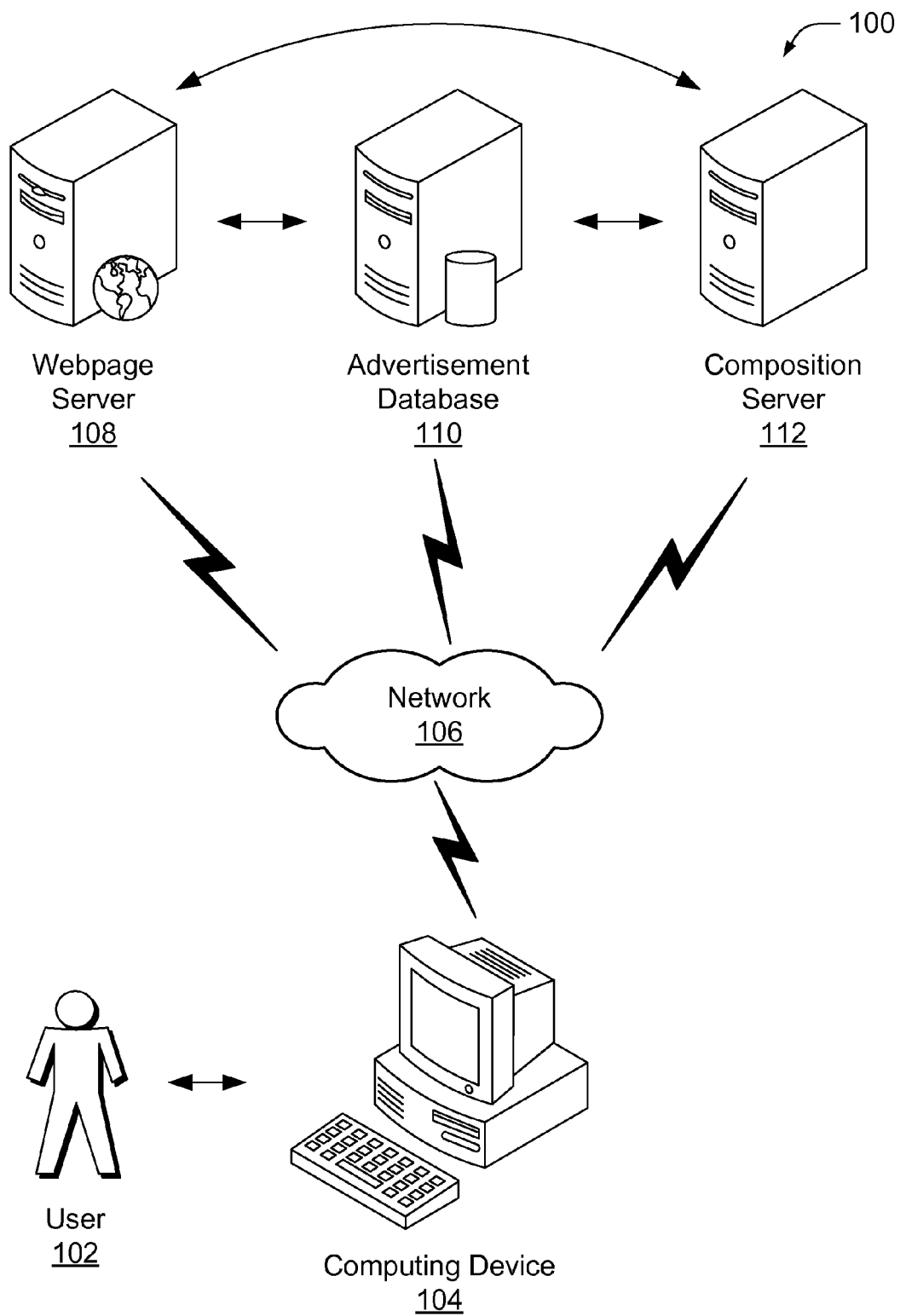
FIG. 1 is a schematic of a system for embedding advertising into web pages.

FIG. 1 shows a systematic of a system 100 for a user 102 to interact with a computing device 104 to browse web pages that contain embedded advertising. The computing device 104 may be connected to a network 106 such as the Internet. In this implementation, webpage content is provided by a webpage server 108, advertising content is provided by advertisement database 110, and the matching of a keyword to an advertisement as well as the creation of a modified webpage with the embedded advertisement is performed by a composition server 112. The servers and databases may be implemented separately or alternately combined to perform the functions as described.

Figure 2:
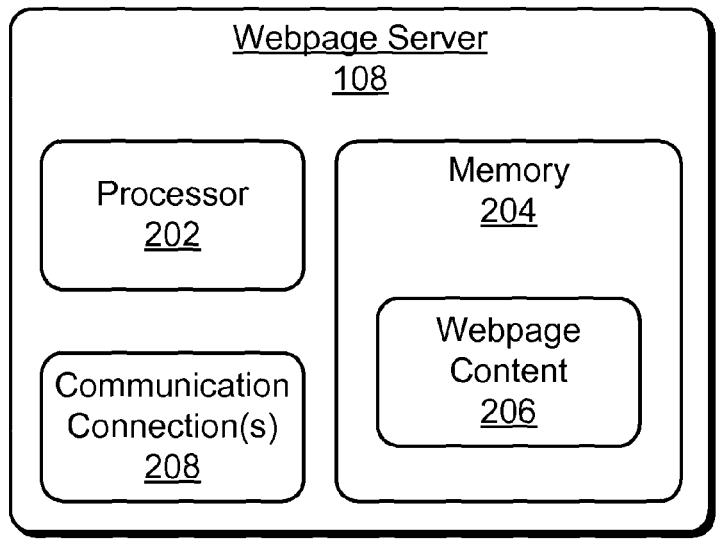
FIG. 2 is a schematic diagram showing an exemplary webpage server.

FIG. 2 shows a schematic diagram 200 of an exemplary webpage server 108. The webpage server 108 contains a processor 202 and a memory 204. The memory 204 contains webpage content 206. The web pages may contain text, images, video, or other content. This content exists in the form created by the webpage author without embedded advertising. The webpage server 108 also contains communication connection(s) 208. The communication connection(s) 208 are configured to provide the webpage content to the composition server 112 where an advertisement from the advertisement database 110 may be embedded into the webpage content 206. The webpage content may be provided via the network 106 or via another communication connection between the webpage server 108 and the composition server 112.

Figure 3:
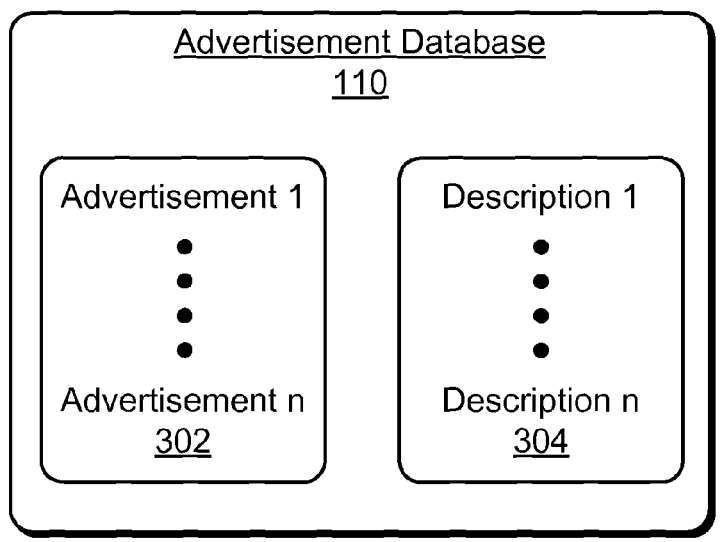
FIG. 3 is a schematic diagram showing an exemplary advertisement database.

FIG. 3 shows a schematic diagram 300 of an exemplary advertisement database 110. The database 110 contains a plurality of advertisements 302 and a plurality of descriptions 304. For each advertisement there may be a corresponding description. The advertisements 302 may include product-related information such as the name, keyword, description, logo, or link to a product page. The description 304 of the advertisement may include text from the advertisement itself or text generated to describe the content of the advertisement. For example, labeling image, video, or audio content with a textual string facilitates matching of that content to the text of the webpage. In some implementations the description 304 may include audio, visual, or numeric information associated with the advertisement. The description 304 may also include words that have been bidded on or purchased by the advertiser. The purchased words may not otherwise have a connection to the advertisement. However, the ability to assign words without a restriction to the description 304 allows for explicit tailoring of the description 304 of an advertisement 302.

Figure 4:
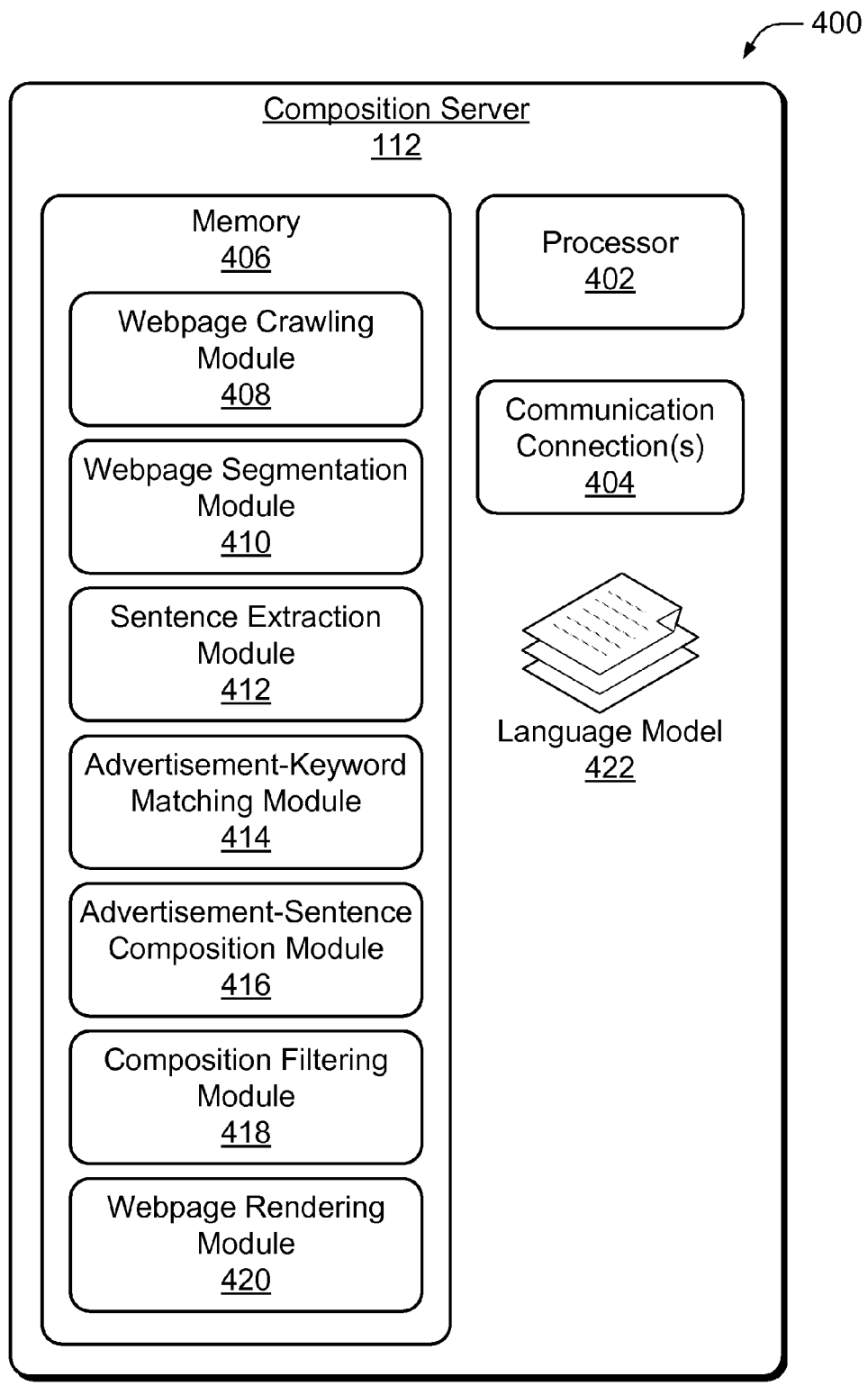
FIG. 4 is a schematic diagram showing an exemplary composition server.

FIG. 4 shows a schematic diagram 400 of an exemplary composition server 112. The composition server includes a processor 402, communication connection(s) 404, and a memory 406. In some implementations, the communication connection(s) 404 may be configured to receive webpage content and send modified webpage content to a computing device such as the computing device 104 shown in FIG. 1.

The memory 406 may include a webpage crawling module 408 configured to crawl web pages in real time. The web pages may include web pages from the webpage server 108. In some implementations, the crawling also includes creating a copy of the crawled web pages in the memory 406 of the composition server 112.

The memory 406 may also include a webpage segmentation module 410. The webpage segmentation module 410 may be configured to segment a webpage into several blocks. Each of the blocks may be a semantic part of the webpage. The original web pages may contain elements such as images, videos, banners, contact information, navigation guides, and other advertisements. Users view the webpage as multiple different semantic objects rather than a single object. Spatial and visual clues enable the users to divide the webpage into several semantic parts. The numerous elements may hinder machine analysis of a main text of the webpage. However, it is possible for a machine to also divide the webpage into semantic parts by using the information encoded in a markup language underlying the webpage.

In one implementation, the webpage segmentation module 410 uses a vision-based page segmentation (VIPS) algorithm to segment of the webpage into blocks. The VIPS algorithm is configured to extract a semantic structure of a webpage based on the visual presentation of the webpage. The VIPS algorithm extracts structure information from a document object model tree of the webpage. The document object model tree of the webpage identifies discreet objects in the webpage based on the coding, or tags, in the markup language that describes the webpage. Next, separators between the extraction blocks are found. The separators may denote horizontal or vertical lines in the webpage that do not cross over any of the blocks. In this way the webpage can be represented by a semantic tree in which each leaf node of the tree corresponds to a block from the webpage. The block of the webpage may be further divided into smaller blocks. Thus, implementations of the VIPS algorithm may repeat to recursively divide the webpage from larger blocks into smaller blocks.

The webpage segmentation module 410 may also identify a main textual block of the webpage. The main textual block may be a textual block which contains more words than other textual block in the same webpage and lies on a focus of the webpage. The focus of the webpage may be determined by identifying the textual block closest to the center of the webpage. In other implementations, the focus of the webpage may be determined by tags or labels in the markup language associated with the block. In some implementations, the main textual block is identified by filtering out other blocks such as blocks containing images, advertisements, or non-textual content. Blocks containing images or advertisements may be identified by analyzing the labels, links, or similar information in the markup language describing the blocks.

The memory 406 may also include a sentence extraction module 412. The sentence extraction module 412 identifies individual sentences from the text of the webpage. In some implementations, the sentences are extracted from only the text of the main textual block. After obtaining all the sentences from the block of the webpage, a statistical parsing model is applied to each of the sentences in order to generate a lexical parse tree for each sentence. In general the statistical parsing model defines a conditional probability for each candidate parse tree generated from a sentence. The parser itself is an algorithm which searches for a best tree that maximizes the probability of the resulting sentence.

The memory 406 may also include an advertisement-keyword matching module 414. The advertisement-keyword matching module 414 receives keywords from the webpage and matches those keywords to the advertisement. In some implementations, the keywords from the webpage are identified by analysis of the text of the webpage. In particular, the analyzed text of the webpage may be the text of the main textual block. The advertisement-keyword matching module 414 associates the descriptions 304 of the advertisements 302 stored in the advertisement database 110 with the keywords from the webpage based upon user logs, word clustering, or bidding rules.

The user logs may be a record of other web pages browsed by a same user. The use of user logs to identify potentially relevant advertisements may be superior to the use of keywords alone because the pool of information used to identify potentially relevant advertisements is based on the actual behavior of the user. If the user, when viewing a certain type of webpage, selected an advertisement, it is likely that a similar advertisement would be of interest to the user when the user is again viewing that type of webpage. For example, if the user clicked on the advertisement from an airline when viewing the webpage about travel, it is likely that the user would be interested in advertisements from airlines when viewing other web pages about travel.

The user logs may be analyzed to determine relationships between web pages and advertisements of interest to the user. In some implementations, a density-based clustering method is used to cluster the information contained in the user logs. One example of a density-based clustering method is the Density-Based Spatial Clustering of Applications with Noise (DBSCAN) algorithm. The DBSCAN algorithm makes use of a spatial indexing structure to locate points in the data within a certain distance from the core point of a cluster. All clusters consisting of less than the minimum number of points are considered as "noise" and are discarded.

Word clustering determines a likely relationship between two words based on the frequency those words occur together in a reference corpus of text. From the reference corpus of text, pair-wise similarity between all the nouns, all the verbs, and all the adjectives/adverbs may be calculated. The reference corpus of text may be, for example, archived newspaper articles. A list of similar words including a measure of similarity is created for each word in the corpus of text based on the pair-wise similarity. An advertisement may be associated with the keyword from the webpage when words in the description of the advertisement are among the words identified as similar to the keyword.

Bidding rules can associate an advertisement with the keyword based on how much money an advertiser is willing to pay for association with a given keyword. In one implementation of bidding rules, the advertiser who places the highest bid can create an association between the keyword and the advertisement.

Association between the keyword and the advertisement may be based on a combination of user logs, word clustering, and bidding rules. Analysis of each of user logs, word clustering, and bidding rules may generate three different strength-of-association values. Each of the three strength-of-association values may be combined in a linear weighted or an average fusion to generate a single, combined strength-of-association value. In some implementations, the weighting could be changed based on empirical observation of the advertisement-keyword matching. The advertisement with a highest combined strength-of-association value may be associated with the keyword. In some implementations, more than one advertisement may be associated with a single keyword such as when more than one advertisement has the same strength-of-association value. It is also possible to create an association between a keyword and multiple advertisements having, for example, the first, second, and third highest combined strength-of-association values.

The memory 406 may also include an advertisement-sentence composition module 416. The advertisement selected for insertion into the sentence may be the advertisement identified by the advertisement-keyword matching module 414. The sentence has already been decomposed into a parse tree by the sentence extraction module 412. Therefore, the task of the advertisement-sentence composition module 416 is to determine how to combine the sentence and the advertisement. The advertisement may contain elements other than text; however, for the purpose of determining how to combine the sentence with the advertisement only the textual elements of the advertisement, or advertizing text, is analyzed. The advertizing text is inserted into a parse tree and a new parse tree is created. This is repeated to create multiple parse trees, each parse tree corresponding to inserting the advertizing text at a different place in the original sentence. Through this process numerous different compositions are created.

The memory 406 may also include a composition filtering module 418. The composition filtering model 418 selects one composition from the numerous different compositions created by the advertisement-sentence composition module 416. The filtering is based on smoothing techniques. Each new parse tree created by inserting the advertizing text into the original sentence has a probability of being a natural and a grammatically correct sentence. The probability of words and phrases is determined by comparison with a language model. The product of the probability of the words and phrases of each new parse tree is the probability of the sentence as a whole. Out of the numerous potential compositions, the composition with a highest probability as compared to the other potential compositions is likely to correspond to the sentence that is natural and grammatically correct. Thus, the composition filtering module 418 selects the new parse tree with the highest probability. By doing so the composition server 112 identifies where in the sentence to insert the advertisement.

The memory 406 may also include a webpage rendering module 420. This module 420 renders the final results of advertisement embedding. The text of the webpage is changed so that the composition identified by the composition filtering module 418 is displayed to the user 102 rather than displaying the original text of the webpage. In some implementations, this is achieved by the composition server 112 intercepting transmissions of the web pages from the webpage server 108 and modifying the webpage by embedding advertising before delivery of the webpage to the computing device 104.

In some implementations, the composition server 112 comprises a language model 422. The language model 422 may comprise a large corpus of text such as the reference corpus discussed above. In some implementation, the large corpus of text is automatically collected from other web pages. This corpus of text provides a set of data that may be analyzed in order to determine the statistical probability of word orders and relationships between words. If a combination of words or a phrase is found in the corpus of text, it is likely that the combination of words or the phrase is a natural combination. By referencing the language model 422, it is possible for a machine to create new sentences and word orders that are likely to be natural and grammatically correct. The language model 422 may be topic specific. A corpus of text based on economics publications may produce more accurate estimations of natural and grammatical sentences for the webpage content related to economics than would a corpus of text based on general news articles. For example, the composition server 112 may contain numerous language models each related to different topics. In some implementations, the composition server 112 may identify a topic of the webpage and choose a language model that corresponds to the topic.

Illustrative Process

Figure 5:
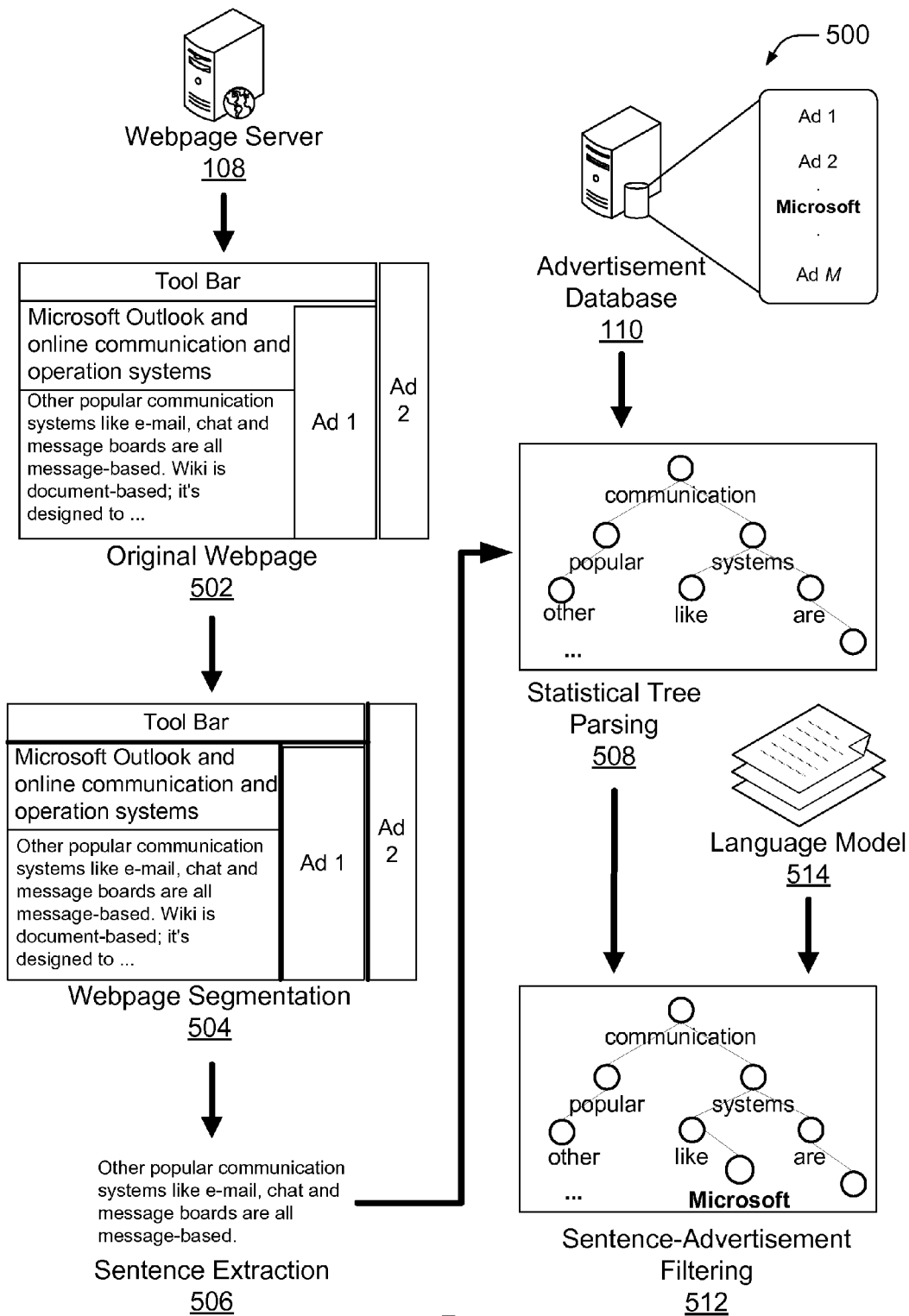
FIG. 5 is schematic diagram showing an exemplary process for embedding advertisements into a webpage.

Illustrated in FIG. 5 is a process 500 for embedding an advertisement into a sentence from a webpage. Webpage server 108 is the source for an original webpage 502. The original webpage 502 may contain a tool bar block, multiple advertisement blocks Ad1, Ad2, and multiple text blocks. The original webpage 502 may be segmented into blocks by a process such as that described above with respect to the webpage segmentation module 410. Webpage segmentation 504 is advantageous because it can identify the single textual block for further analysis thus reducing the amount of information that must be processed in order to embed the advertisement in the sentence.

The sentence is extracted from the webpage 506. Extraction of only one sentence is illustrated; however, more than one sentence or even all the sentences from the webpage may be extracted and analyzed separately.

The process 500 next proceeds to creating a statistical tree parsing of the sentence 508. In this illustration, the first five words of the sentence (e.g. other/popular/communication/systems/like) and the word "are" are shown as nodes of the tree. Each node in the tree indicates one word. The statistical tree parsing of the sentence is combined with the advertisement from the advertisement database 110. The advertisement or advertisements selected from the advertisement database 110 for combination with the sentence from the statistical tree parsing 508 may be selected by a method similar to that performed by the advertisement-keyword matching module 414. In this illustration, the advertisement is represented by the word "Microsoft".

Inserting the advertisement next to the node for the word "like" creates a modified statistical tree representation of the sentence. This position for inserting the advertisement is selected through sentence-advertisement of filtering 512. The process of sentence-advertisement filtering 512 may be similar to the process performed by the composition filtering module 418. A language model 514 supplies the criterion for the filtering to the sentence-advertisement filtering 512. In other words, the place of insertion for "Microsoft" is based on where in the extracted sentence it would be most probable according to the language model 514. The language model 514 shown in FIG. 5 may be the same as the language model 422 shown in FIG. 4. In some implementations, the language model may exist separately from the composition server 112.

Figure 6:
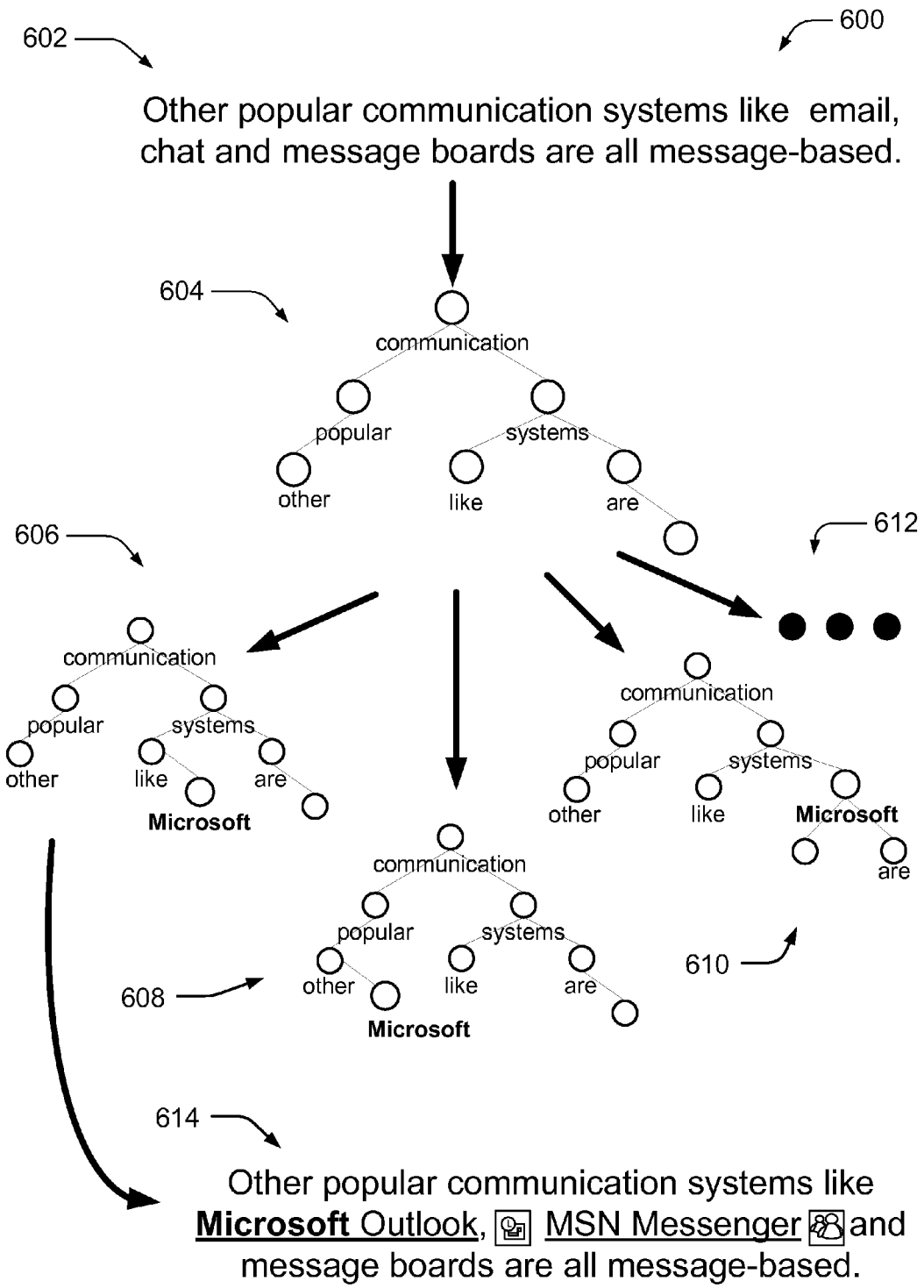
FIG. 6 is a schematic diagram showing the text of a webpage before and after embedding advertising.

FIG. 6 shows in greater detail the statistical tree parsing 508 and the sentence advertising filtering 512 of FIG. 5. The process 600 shown in FIG. 6 begins with a sentence 602 extracted from a webpage. This is the same sentence shown in FIG. 5. The lexical parse tree 604 of the sentence is created by a parsing model such as a $0^{th}$-order Markov process. The parsing model identifies a lexical head-word, or head-word. In some implementations, the head-word is the keyword from the sentence. In this illustration the head-word is "communication", which is shown sitting on top of the lexical parse tree 604. The probability of the head-word is $P_H(H|P, h)$. Where H is the head-child of the phrase, $P_H$ is the probability of H, P is a parent of the head-word, and h is the head-word.

Modifiers are generated to the right of the head-word with a probability shown as:

$$\prod_{i=1\ldots m+1} P_H(R_i(r_i) | P, h, H).$$

$R_{m+1}(r_{m+1})$ is defined as STOP—the STOP symbol is added to the vocabulary of non-terminals, and the parsing model stops generating right modifiers when the STOP symbol is generated. $R_1 \ldots R_m$ are right modifiers of H. Modifiers are also generated to the left of the head-word with a probability shown as:

$$\prod_{i=1\ldots n+1} P_L(L_i(l_i) | P, h, H).$$

For modifiers generated to the left, $L_{n+1}(l_{n+1})$ is defined as STOP. $L_1 \ldots L_n$ are left modifiers of H. Either n or m may be 0, and n=1=0 for unary rules.

Given the lexical parse tree 604 obtained for the sentence 602 and the ad word (e.g. Microsoft), the ad word is inserted adjacent to a node in the lexical parse tree 604. In some implementations, the ad word is inserted next to every node in the lexical parse tree 604. The ad word may be inserted adjacent to the node corresponding to the word "like" 606, the node corresponding to the word "other" 608, the node corresponding to the word "systems" 610, or any other node 612. The details of other possible lexical parse trees are not shown in FIG. 6 for the sake of brevity.

One parse tree is selected from the multiple parse trees 606-612 that are created by combining the sentence and the ad word. In one implementation the selection is based on the probability of insertion as calculated by an n-gram language model. In this example, the selected parse tree is the lexical parse tree 606 on the left side of FIG. 6.

In an n-gram language model the probability of a sentence P(s) is expressed as the product of the probability of the words that compose the sentence, with each word probability conditional on the identity of the last n-I words. Thus, for sentence s comprising words $w_i \ldots w_l$, the probability of a sentence P(s) is shown as:

$$P(s) = \prod_{i=1}^{l} P(w_i | w_1^{j-1})$$

$$\approx \prod_{i=1}^{l} P(w_i | w_{1-n+1}^{j-1})$$

Typically, n is taken to be 2 or 3, corresponding to a bigram or trigram model, respectively. Each possible sentence generated by inserting an ad word into the lexical parse tree 604 will have a probability associated with that sentence. Out of the possible sentences in this example, 606-612, the lexical parse tree 606 on the left side of FIG. 6 has a probability higher than any of the other possible lexical parse trees 608-612. Thus, this algorithm selects an insertion point for the ad word with a maximal P(s). In this example, "Other popular communication systems like Microsoft . . . " 606 is more probable than "Microsoft other popular communication systems like . . . " 608 or "Other popular communication systems Microsoft like . . . " 610.

As discussed earlier, the advertisement may be more than just the ad word. In this example the ad word is "Microsoft" yet the advertisement comprises the text "Microsoft Outlook, MSN Messenger" and images representing MICROSOFT OUTLOOK™ and MSN MESSENGER™. The advertisement also comprises hyperlinks, or links, to another website. The links are indicated by the underlining of "Microsoft Outlook" and "MSN Messenger". The original sentence 602 is modified by including the advertisement at the position indicated by the n-gram language model resulting in a new sentence 614 that is a composition of the original sentence 602 and the advertisement.

Exemplary Flowchart

Figure 7:
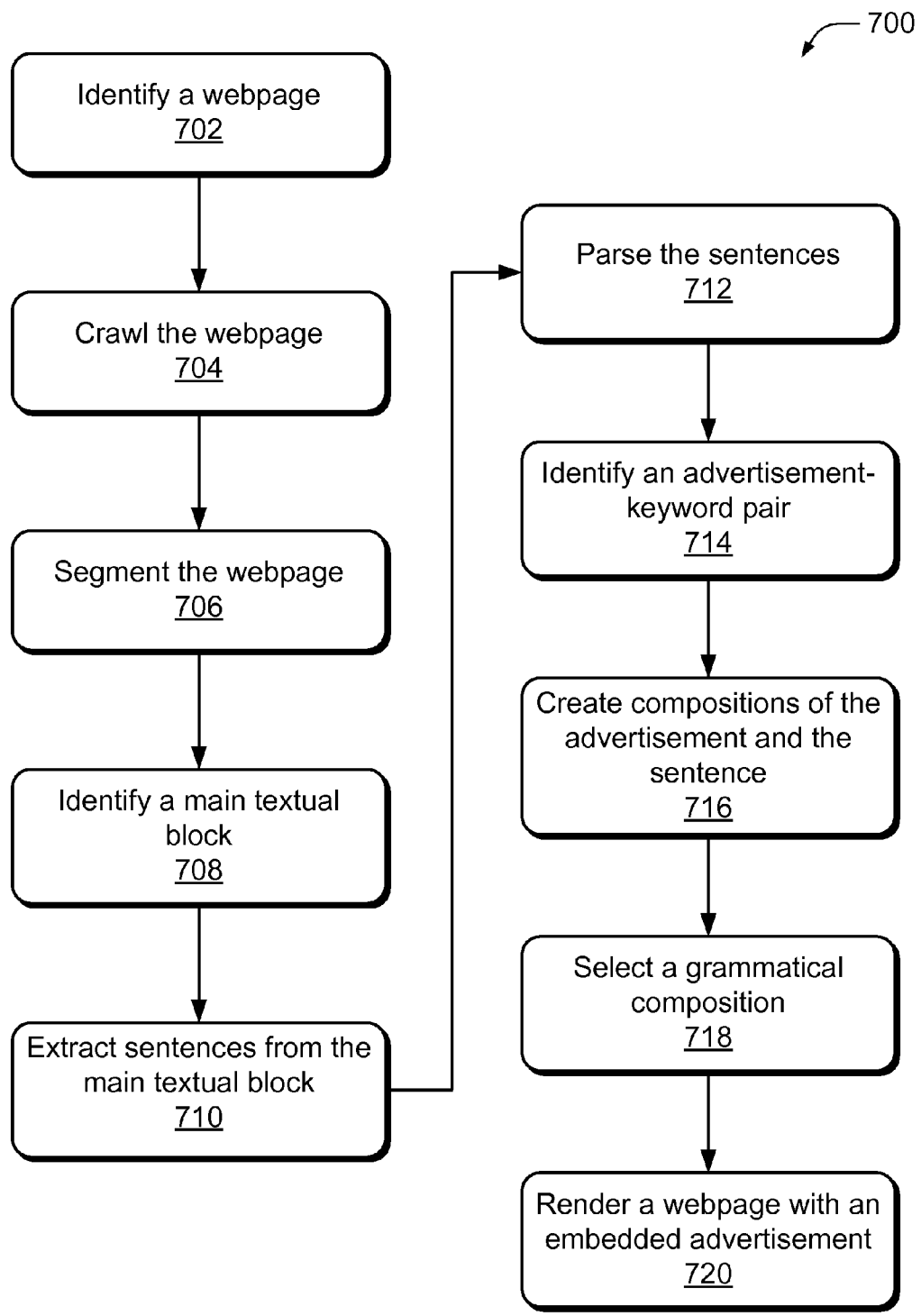
FIG. 7 is a flowchart showing an exemplary method for rendering a webpage with an embedded advertisement.

Illustrated in FIG. 7 is an exemplary flowchart of a process 700 for generating a webpage with embedded advertising.

For ease of understanding, the method 700 is delineated as separate steps represented as independent blocks in FIG. 7. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps will be omitted.

The flowchart for the process 700 provides an example of a method that may be performed by the composition server 112. In other implementations, the process may be performed by another specialized device other than the composition server 112. Alternatively, the process 700 may also be performed across a plurality of devices.

Shown at block 702, the process 700 identifies a webpage. The webpage may be stored in the memory of a webpage server such as the webpage server 108 shown in FIG. 2.

Shown at block 704, the process 700 crawls the webpage. Crawling of a webpage may be performed by any program or script that browses a collection web pages, such as the World Wide Web, in a methodical, automated manner. Some examples of web page crawlers are programs used to automatically index web pages for search engines.

Shown at block 706, the process 700 segments the web page. The webpage may be segmented by a machine-vision algorithm such as discussed above with respect to the webpage segmentation module 410. In some implementations, the machine-vision algorithm is the VIPS algorithm.

Shown at block 708, the process 700 identifies a main textual block. The main textual block may be identified subsequent to segmenting the webpage. In other implementations that do not segment the webpage, the main textual block may be extracted from the webpage without segmentation. Identification of the main textual block may be performed in a manner similar to that discussed above with respect to the webpage segmentation module 410.

Shown at block 710, the process 700 extracts sentences from the main textual block. The extraction of sentences may be similar to the sentence extraction of 506 shown in FIG. 5. In some implementations, individual sentences are identified by reference to sentence ending marks (e.g. ".", "?", "!", etc.) and initial capital letters. The extraction of sentences may include distinguishing individual sentences as discrete items for further processing or analysis.

Shown at block 712, the process 700 parses the sentences. In some implementations parsing of the sentences involves identification of individual words within the sentences. The first step of parsing the sentences may be to decompose the sentences into a tree using a language model. Parsing of the sentences may also be done by creating a parse tree of the sentence similar to the lexical parse tree 604 discussed above with respect to FIG. 6.

Shown at block 714, the process 700 identifies an advertisement-keyword pair. Identification of the advertisement-keyword pair may be performed in a manner similar to that of the advertisement-keyword matching module 414. In some implementations, the keyword is associated with a particular sentence, and thus, associating the advertisement with the keyword also associates the advertisement with the sentence. If the given keyword appears in the sentence or the block of text more than once, the advertisement may have associations with multiple places in the sentence or multiple sentences in a block of text. Similar to other types of advertising, with embedded advertising it is possible to present the same advertisement multiple times on the single webpage.

Shown at block 716, the process 700 creates compositions of the advertisement and the sentence. The compositions may be created in a manner similar to that discussed above with respect to the advertisement-sentence composition module 416. Typically, but not always, multiple compositions will be created for a given keyword-sentence pair. The compositions may create new sentences by inserting the advertisement in various places in the original sentence similar to that illustrated in FIG. 6. The selection of where and how to insert the advertisement into the original sentences may be done randomly and/or without knowledge of grammar or rules of sentence construction. Thus, it is possible that many of the compositions would appear unnatural or ungrammatical to a human reader.

Shown at block 718, the process 700 selects a grammatical composition. If only one composition is created that composition will automatically be selected as the grammatical composition. If there are multiple compositions to select from, the process of selection may be similar to that performed by the composition filtering module 418. The process of selecting a grammatical composition attempts to pick one sentence that will appear grammatical and natural to the human reader from multiple sentences created by an algorithm implemented on a computing device.

Shown at block 720, the process 700 renders a webpage with an embedded advertisement. The rendering may be similar to that performed by the webpage rendering module 420. Embedding the advertisement into the original text of the webpage creates embedded advertising. The advertising is presented to the user in a portion of the webpage that the user is likely to view and the advertising is integrated with the content of the webpage such that it is difficult for the user to ignore the advertising. As discussed with respect to modify a sentence 614, text, images, videos, hyperlinks, or other advertising may be embedded into the webpage.

Exemplary Computing Device

Figure 8:
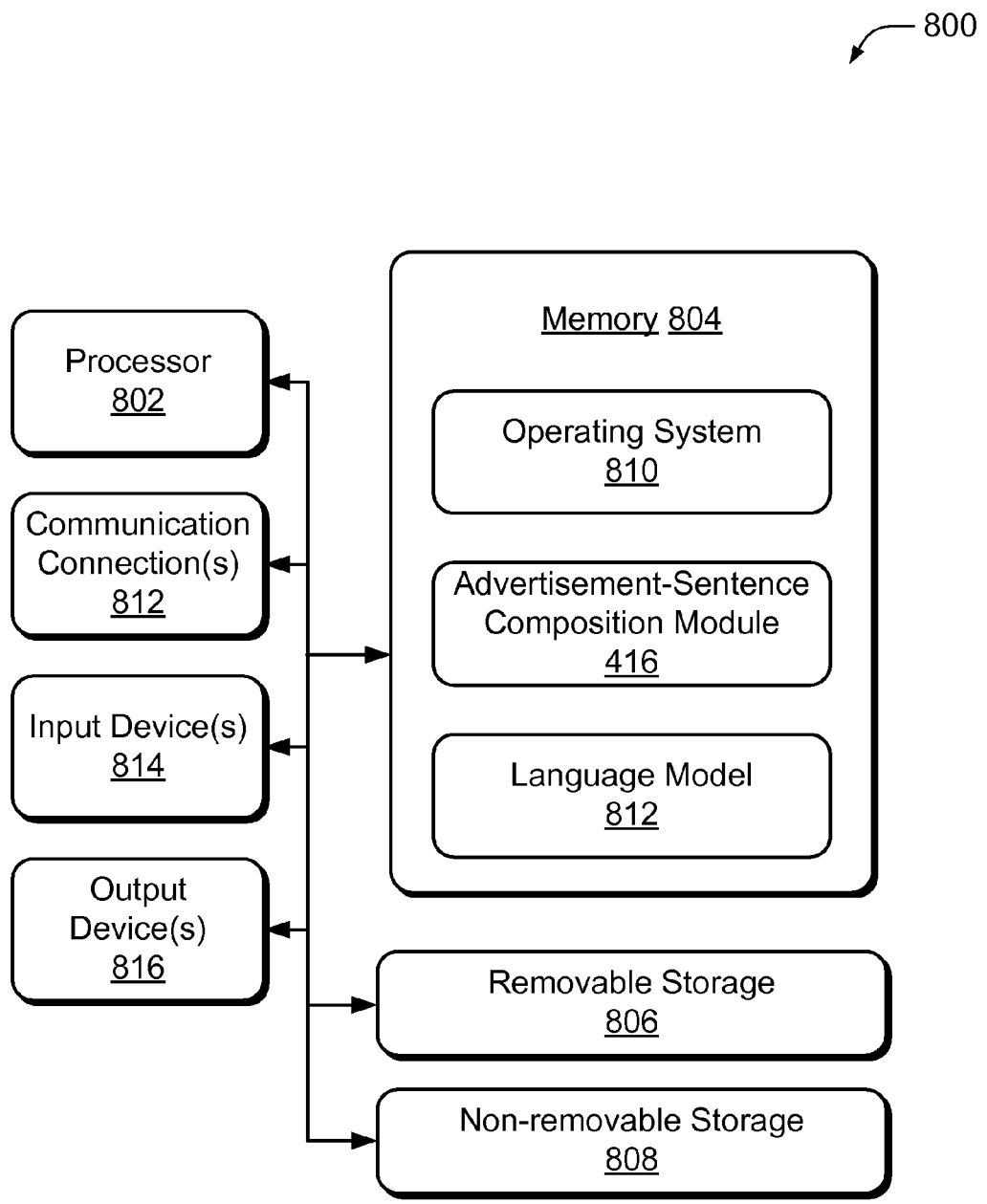
FIG. 8 is a schematic diagram showing an exemplary computing device for embedding advertisements into text.

FIG. 8 is a block diagram showing an exemplary computing device 800 for creating embedded advertising. The computing device 800 may be configured as any suitable system capable of creating an advertisement-sentence composition. In one exemplary configuration, the system comprises at least one processor 802 and memory 804. The processor 802 may be implemented as appropriate in hardware, software, firmware, or combinations thereof. Software or firmware implementations of the processor 802 may include computer- or machine-executable instructions written in any suitable programming language to perform the various functions described.

For example, the computing device 800 illustrates architecture of these components residing on one system or one server that may be communicatively coupled to a network such as the network 106 shown in FIG. 1. Alternatively, these components may reside in multiple other locations, servers, or systems. For instance, all of the components may exist on a client side. Furthermore, two or more of the illustrated components may combine to form a single component at a single location. The illustrated components may also reside in a computing device without a connection to a network, such as a stand-alone database. The computing device 800 is not limited to the composition server 112. In some implementations, the computing device 800 may be similar to the computing device 104 shown above in FIG. 1.

Memory 804 may store programs of instructions that are loadable and executable on the processor, as well as data generated during the execution of these programs. Depending on the configuration and type of computing device 800, memory 804 may be volatile (such as RAM) and/or nonvolatile (such as ROM, flash memory, etc.). The computing device 800 may also include additional removable storage 806 and/or non-removable storage 808 including, but not limited to, magnetic storage, optical disks, and/or tape storage. The disk drives and their associated computer-readable media may provide non-volatile storage of computer readable instructions, data structures, program modules, and other data for the communication devices.

Turning to the contents of the memory 804 in more detail, the memory 804 may include an operating system 810 and an advertisement-sentence composition module 416 for creating compositions of advertisements and sentences. The memory 804 may also, in some implementations, contain a language model 812 which may be similar to language model 422 or language model 514. The multiple language models, such as language model 812, language model 422, and language model 514, could be the same or different language models. Also, the computing device 800 may include a database hosted on the processor 802 (not shown).

Computer storage media includes volatile and nonvolatile, removable and non-removable media implemented in any method or technology for storage of information such as computer readable instructions, data structures, program modules or other data. Memory 804, removable storage, and non-removable storage are all examples of computer storage media. Additional types of computer storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 800.

The computing device 800 may also contain communication connection(s) 812 that allows the processor 802 to communicate with servers, user terminals, and/or other devices on a network. Communication connection(s) 812 is an example of a communication media. Communication media typically embodies computer readable instructions, data structures, and program modules. By way of example, and not limitation, communication media includes wired media such as a wired network or direct-wired connection, and wireless media such as acoustic, RF, infrared and other wireless media. The term computer readable media as used herein includes both storage media and communication media.

The computing device 800 may also include input device(s) 814 such as a keyboard, mouse, pen, voice input device, touch input device, stylus, and the like, and output device(s), 816 such as a display, monitor, speakers, printer, etc. All these devices are well known in the art and need not be discussed at length.

The subject matter described above can be implemented in hardware, software, or in both hardware and software. Although implementations of embedded advertising have been described in language specific to structural features and/or methodological acts, it is to be understood that the subject matter defined in the appended claims is not necessarily limited to the specific features or acts described above. Rather, the specific features and acts are disclosed as exemplary forms of exemplary implementations of generating embedded advertising. For example, the methodological acts need not be performed in the order or combinations described herein, and may be performed in any combination of one or more acts.

The invention claimed is:

1. A computer-readable storage medium comprising computer-executable instructions that, when executed by a processor, cause a computing device to perform acts for embedding advertising into a web page, the acts comprising:
   identifying a webpage, provided by a publisher that subscribes to an embedded advertising service;
   extracting a sentence from the webpage;
   generating a parse tree for the sentence, wherein each word in the sentence is a node in the parse tree;
   associating an advertisement stored in an advertisement database with the sentence, wherein the advertisement comprises an advertising text;
   creating a plurality of compositions of the advertisement and the sentence by inserting the advertising text into the parse tree adjacent to nodes in the parse tree;
   calculating a probability for each of plurality of compositions based on a language model;
   selecting a grammatical composition from the plurality of compositions based at least in part on the probability; and
   rendering the webpage with the grammatical composition.

2. The computer-readable storage medium of claim 1, the acts further comprising:
   crawling the webpage and based at least in part on the crawling, creating a copy of the web page in a composition server;
   segmenting the copy of the webpage into blocks, wherein the blocks are semantic parts of the copy of the webpage; and
   identifying a main textual block from the blocks.

3. The computer-readable storage medium of claim 2, wherein the segmenting is performed using a computer-vision page segmentation algorithm, the algorithm comprising:
   extracting the blocks from the webpage based on visual differences indicated in a markup language representation of the webpage;
   finding separators between the blocks, wherein the separators comprise horizontal or vertical lines; and
   creating a semantic tree based on the separators, wherein the semantic tree includes a leaf node corresponding to a one of the blocks.

4. The computer-readable storage medium of claim 2, wherein the main textual block comprises a block which contains more words than other blocks in the web page and is on a focus of the webpage.

5. The computer-readable storage medium of claim 1, wherein the generating the parse tree for the sentence comprises:
   identifying a head-word of the sentence;
   generating modifiers to a right of the head-word; and
   generating modifiers to a left of the head-word.

6. The computer-readable storage medium of claim 1, wherein the associating is based at least in part upon at least one of user logs, a word clustering, or bidding rules.

7. The computer-readable storage medium of claim 6, wherein the associating is based at least in part on user logs and the user logs comprise:
   a record of other web pages browsed by a user; and
   a Density-Based Spatial Clustering of Applications with Noise (DBSCAN) algorithm to associate the advertisement with the sentence.

8. The computer-readable storage medium of claim 6, wherein the associating is based at least in part on the word clustering and the word clustering comprises:
   creating a language model from a corpus of text;
   computing a pair-wise similarity between nouns, verbs, and adjectives or adverbs in the corpus of text;
   creating a list of similar words for each word in the language model;

matching the advertising text with a word in the language model and the list of similar words corresponding to the word; and associating the advertisement with the sentence, based on the matching, such that a word in the sentence is in the list of similar words.

9. The computer-readable storage medium of claim 1, wherein the calculating a probability comprises:

calculating the probability for word strings based at least in part on a frequency of the word strings occurring in the language model, wherein the language model comprises a corpus of text; and calculating the probability for each one of the compositions, wherein the probability of a one of the compositions is a product of the probabilities of the word strings that comprise the composition.

10. The computer-readable storage medium of claim 1, wherein the selecting a grammatical composition comprises:

comparing the probability of a plurality of the grammatical compositions; and selecting a one of the plurality of grammatical compositions with a highest probability as compared to the other grammatical compositions, wherein the probability of a grammatical composition is based at least in part on a probability of word strings in the grammatical composition.

11. A method implemented at least partially by a processor, the method comprising:

identifying a webpage, provided by a publisher that subscribes to an embedded advertising service;

extracting a sentence from the webpage;

generating a parse tree for the sentence, wherein each word in the sentence is a node in the parse tree;

associating an advertisement stored in an advertisement database with the sentence, wherein the advertisement comprises an advertising text;

creating a plurality of compositions of the advertisement and the sentence by inserting the advertising text into the parse tree adjacent to nodes in the parse tree;

calculating, by the processor, a probability for each of plurality of compositions based at least in part on a language model; and selecting a grammatical composition from the plurality of compositions based at least in part on the probability.

12. The method of claim 11, further comprising:

crawling the webpage and based at least in part on the crawling, creating a copy of the web page in a composition server;

segmenting the copy of the webpage into blocks, wherein the blocks are semantic parts of the copy of the webpage; and identifying a main textual block from the blocks.

13. The method of claim 12, wherein the segmenting is performed using a computer-vision page segmentation algorithm, the algorithm comprising:

extracting the blocks from the webpage based at least in part on visual differences indicated in a markup language representation of the webpage;

finding separators between the blocks, wherein the separators comprise horizontal or vertical lines; and creating a semantic tree based on the separators, wherein the semantic tree includes a leaf node corresponding to a one of the blocks.

14. The method of claim 12, wherein the main textual block comprises a block which contains more words than other blocks in the web page and is on a focus of the webpage.

15. The method of claim 11, wherein the associating is based at least in part upon at least one of user logs, a word clustering, or bidding rules.

16. A computing device comprising:

one or more processors;

one or more memory coupled to the one or more processors, the one or more memory having instructions for the one or more processors to perform acts comprising:

identifying a webpage, provided by a publisher that subscribes to an embedded advertising service;

extracting a sentence from the webpage;

generating a parse tree for the sentence, wherein each word in the sentence is a node in the parse tree;

associating an advertisement stored in an advertisement database with the sentence, wherein the advertisement comprises an advertising text;

creating a plurality of compositions of the advertisement and the sentence by inserting the advertising text into the parse tree adjacent to nodes in the parse tree;

selecting a grammatical composition from the plurality of compositions; and rendering the webpage with the grammatical composition being selected.

17. The computing device of claim 16, wherein the associating is based at least in part upon at least one of user logs, a word clustering, or bidding rules.

18. The computing device of claim 17, wherein the user logs comprise:

a record of other web pages browsed by a user; and a Density-Based Spatial Clustering of Applications with Noise (DBSCAN) algorithm to associate the advertisement with the sentence.

19. The computing device of claim 17, wherein the word clustering comprises:

creating a language model from a corpus of text;

computing a pair-wise similarity between nouns, verbs, and adjectives or adverbs in the corpus of text;

creating a list of similar words for each word in the language model;

matching the advertising text with a word in the language model and the list of similar words corresponding to the word; and associating the advertisement with the sentence, based on the matching, such that a word in the sentence is in the list of similar words.

20. The computing device of claim 16, wherein the selecting a grammatical composition comprises:

comparing a probability of a plurality of the grammatical compositions; and selecting a one of the plurality of grammatical compositions with a highest probability as compared to other grammatical compositions, wherein the probability of a grammatical composition is based at least in part on a probability of word strings in the grammatical composition.

* * * * *